(12) United States Patent
Roberts

(10) Patent No.: US 6,618,142 B1
(45) Date of Patent: Sep. 9, 2003

(54) COMPACT BIREFRINGENT SPECTROMETER

(75) Inventor: Mark W. Roberts, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/891,704

(22) Filed: Jun. 26, 2001

(51) Int. Cl.⁷ .................................................. G01J 3/28
(52) U.S. Cl. ........................ 356/327; 356/326; 356/331; 359/352; 359/495; 359/615
(58) Field of Search ................................. 356/326, 300, 356/327, 331, 332; 359/350, 352, 487, 488, 494, 495, 496, 497, 498, 500, 615, 831, 837; 385/36; 362/19, 26, 31

(56) References Cited

U.S. PATENT DOCUMENTS

| | | | |
|---|---|---|---|
| 3,432,238 A | * | 3/1969 | Girard ........................ 356/330 |
| 3,586,872 A | * | 6/1971 | Tien ............................ 359/332 |
| 3,614,198 A | * | 10/1971 | Martin et al. ................ 385/129 |
| 3,998,524 A | * | 12/1976 | Hubby, Jr. et al. .......... 359/496 |
| 4,320,973 A | | 3/1982 | Fortunato et al. |
| 5,317,524 A | * | 5/1994 | Das et al. .................... 702/134 |
| 5,446,534 A | * | 8/1995 | Goldman .................... 356/128 |
| 5,561,522 A | | 10/1996 | Rapoport et al. |
| 5,589,931 A | | 12/1996 | Rapoport et al. |
| 5,694,205 A | | 12/1997 | Gualtieri et al. |
| 5,781,293 A | | 7/1998 | Padgett et al. |
| 5,825,492 A | | 10/1998 | Mason |
| 6,031,233 A | | 2/2000 | Levin et al. |
| 6,172,824 B1 | | 1/2001 | Lehmann et al. |
| 6,222,627 B1 | | 4/2001 | Seitz et al. |
| 6,222,632 B1 | | 4/2001 | Bakin |

* cited by examiner

Primary Examiner—Thong Nguyen
Assistant Examiner—Arnel C. Lavarias
(74) Attorney, Agent, or Firm—Peter A. Lipovsky; Michael A. Kagan; Allan Y. Lee

(57) ABSTRACT

A spectrometer uses collimated, P-polarized light made incident on a surface of an optically transparent material at angle $\theta_{INC}$. The material transmits the light which reaches a boundary surface between the input material and an output optically transparent material. The input material is preferably highly dispersive, making Snell component values at the boundary surface markedly different for different wavelengths. The output material is preferably of low dispersion and high birefringence. Only one wavelength at the boundary surface has a Snell component value tangent to its corresponding index surface in the output section. Within this section, the ray vector for this wavelength is parallel to the boundary surface. Because optical energy propagates in the ray vector direction, only the narrow range of wavelengths having ray vectors substantially parallel to the boundary surface reach an output surface of the device. This narrow range of wavelengths comprises the passband incident on a detector.

14 Claims, 3 Drawing Sheets

COMPACT BIREFRINGENT SPECTROMETER

BACKGROUND OF THE INVENTION

This invention relates generally to spectroscopy and, in particular, to a compact spectrometer capable of a broad spectral range.

There is a continuing need for a simple, compact spectrometer which has a narrow passband and can be used over a broad spectral range. Prism or grating spectrometers may be used to analyze a wide spectral range but require a large physical size to achieve sufficient separation of spectra. While these types of spectrometers may be made smaller, a loss of spectral resolution will occur. Fabry-Perot spectrometers utilizing etalons are capable of very high resolution with small size, but an individual etalon cannot cover a broad spectral range.

To obtain a spectrometer that has small dimensions, a narrow passband, and that can be used over a broad spectral range, a significant improvement over present spectrometer designs must be made.

SUMMARY OF THE INVENTION

In the invention, collimated, P-polarized light is made incident on an input surface of an optically transparent material at an angle $\theta_{INC}$. The light is transmitted through this input transparent material, and reaches a boundary surface between the input material and an output optically transparent material. The material of the input section is preferably highly dispersive, making Snell component values (n sin θ) at the boundary surface markedly different for different wavelengths (colors). The material of the output optically transparent material is preferably of low dispersion and high birefringence, such as is characteristic of calcite, for example. The output optically transmissive material is oriented so that its optic axis is other than normal to the boundary surface and is aligned to maximize the birefringence effect of the material.

Only one wavelength present at the boundary surface has a Snell component value (n sin θ) that is tangent to its corresponding index surface in the output section of the invention. Within this output section, the ray vector, (r), for this wavelength, is parallel to the boundary surface.

Because optical energy propagates in the direction of the ray vector, only the narrow range of wavelengths having ray vectors that are substantially parallel to the boundary surface are able to reach an output surface at an end of the output section. This narrow range of wavelengths in comprises the passband which is incident on the detector.

Other objects, advantages and new features of the invention will become apparent from the following detailed description of the invention when considered in conjunction with the accompanied drawings.

DESCRIPTION OF THE INVENTION

Figure 1:
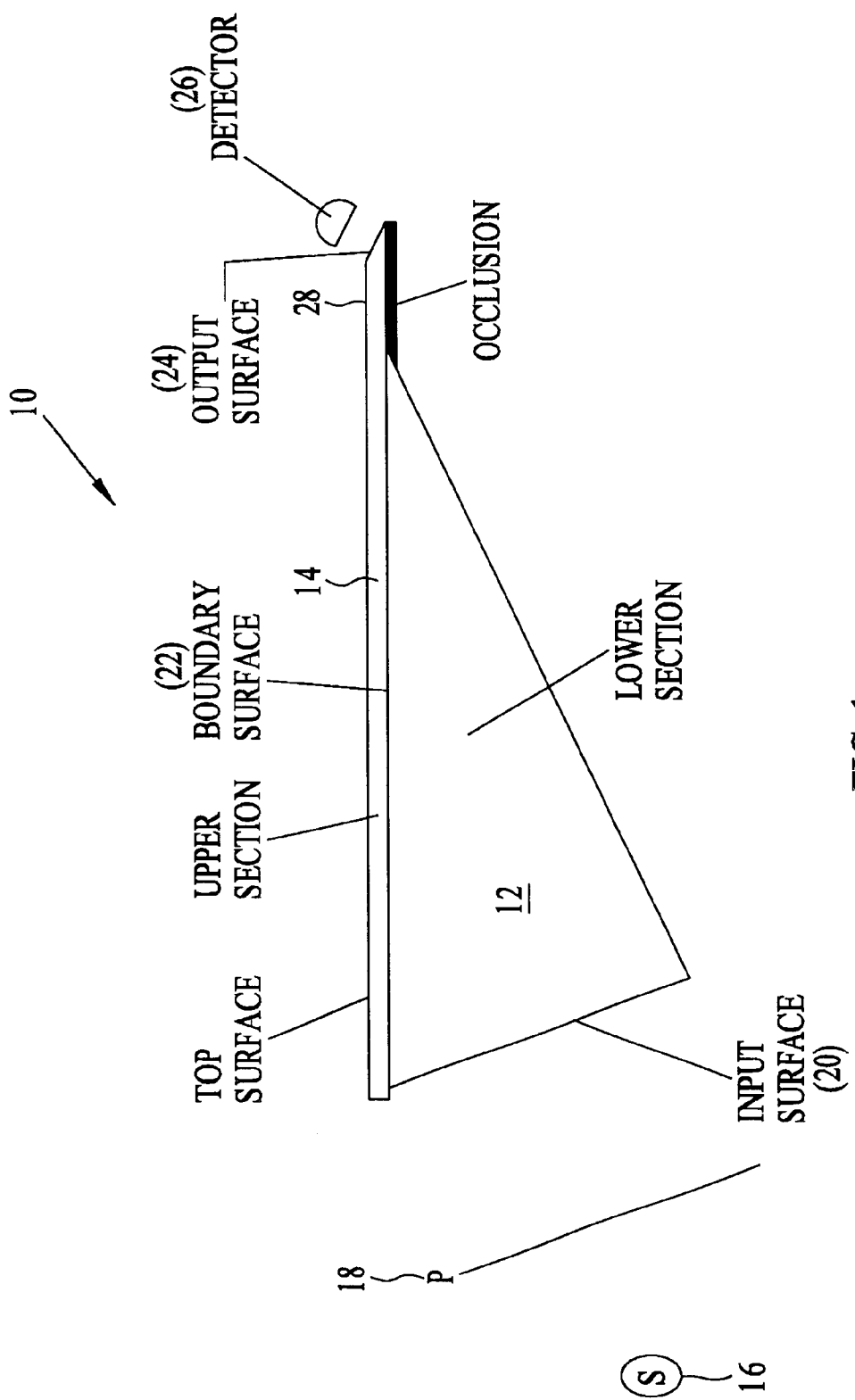
FIG. 1 illustrates a top view of an exemplary embodiment of the invention.

Referring to FIG. 1, spectrometer 10 has two sections 12 and 14 which are held together in good optical contact. Lower (input) section 12 is an optically transparent material that has relatively large dispersion (difference in refractive indices) over the wavelength range being analyzed, resulting in a large difference between radii of index surfaces as a function of wavelength. This section may be made from either an isotropic or a birefringent material. The upper (output) section is a thin, optically transparent material that can be as little as a few wavelengths in thickness (shown in the figure as the distance between top and boundary surfaces). In a preferred embodiment, this material is strongly birefringent—it has a large difference between its ordinary and extraordinary refractive indices at any given wavelength—but has very little dispersion as a function of wavelength. The length of the device can be as small as several tenths of a millimeter with millimeter and centimeter sizes being typical. The height and length of both the input and output sections of the invention are a function of desired light collection, a determination of which can be made by one of ordinary skill in the art.

Figure 2:
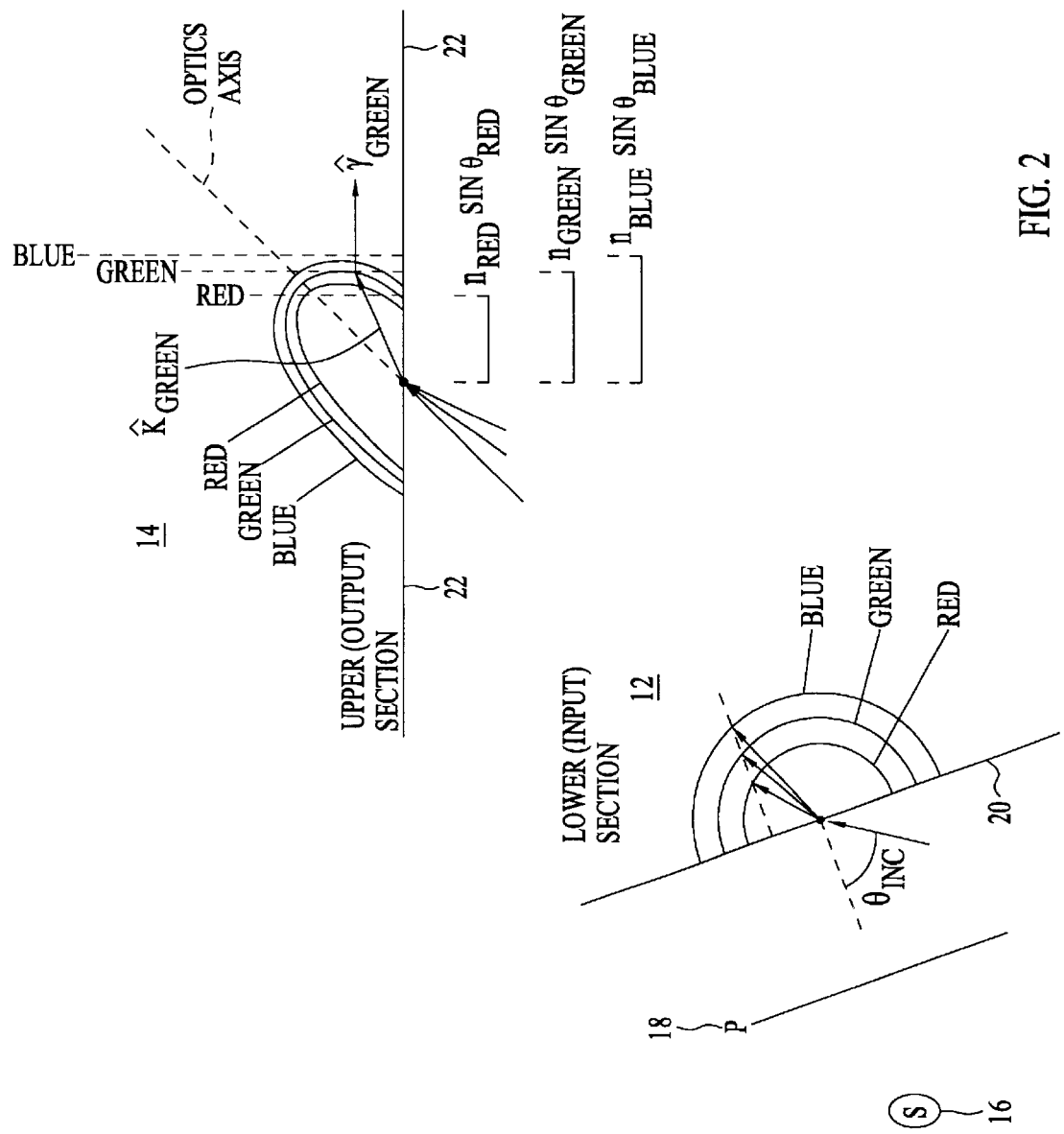
FIG. 2 describes the optical mechanism of the spectrometer of the invention.

The operation of the spectrometer is described with reference to FIG. 2, wherein the plane of light utilized coincides, for explanation purposes, with the plane of the paper upon which this a figure is illustrated. In this figure, the index surfaces for red, green, and blue light are shown. In a preferred embodiment, the lower section is isotropic and the upper section is uniaxial, however the lower section may also be birefringent and the upper section biaxial. The characteristic of the lower section as used in the invention is light dispersiveness. In the upper section, birefringence is optimized as shown whether uniaxial or biaxial materials are used. In FIG. 2, normal chromatic order is shown: the index surface for blue light is larger than that for green, which is larger than the index surface for red light.

Collimated light from source 16 is polarized through P-polarizer 18 so that P-polarized light is incident on an input surface 20 of input section 12 at angle $\theta_{INC}$. The light is transmitted through lower input section 12 and reaches boundary surface 22 between the two sections. Since the material of the lower section is highly dispersive, the Snell component values (n sin θ) of the incoming light present at boundary surface 22 are markedly different for the different wavelengths (colors) of light. Only one wavelength has a value of (n sin θ) which is tangent to its corresponding index surface in upper output section 14, the optic axis of this section being other than normal to surface 22. In FIG. 2, this is shown for green light. Within upper output section 14, the ray vector, r, for this wavelength is parallel to boundary surface 22.

Because optical energy propagates in the direction of the ray vector, only a narrow range of wavelengths which have ray vectors that are substantially parallel to the boundary surface are able to reach the output surface at the right side of the upper section. This narrow range of wavelengths comprises the passband which reaches the detector.

Referring again to FIG. 1 upper output section 14 has an output surface 24 that is beveled so that its angle with respect to the propagation vector, k, of the light in the passband is approximately equal to Brewster's angle. This allows for maximum transmission of the energy in the passband through the output surface to an associated detector 26 which in a preferred embodiment is fastened to the spectrometer. Alternatively, the entrance aperture of a fiber optic may be used in place of the detector shown. The fiber optic is then used to transmit the light from the output surface to a detector which may be some distance from the spectrometer.

A small length 28 of upper section 14 extends beyond the edge of lower section 12 terminating in output surface 24 of the device. The extension functions to substantially prevent light from the lower section from directly reaching the output surface. Lengthening this extension will cause a narrowing of the passband width of the spectrometer. The light input side of the extension is purposely occluded to prevent stray light from reaching the output surface. The occlusion is thick enough to provide mechanical support for the thin extension and can be a sub-micron sized metal layer or an opaque plastic layer, for example.

For a particular $\theta_{INC}$, wavelengths that are outside of the passband cannot reach the output surface. Shorter wavelengths cannot obey Snell's Law ($n_1 \sin \theta_1 = n_2 \sin \theta_2$) at the boundary surface (22) and are totally reflected (k vector total internal reflection). In FIG. 2, this is true for the blue light.

Longer wavelengths are able to enter the upper section, but cannot reach the output surface. The ray vectors of these colors cause their energy to be transmitted through the upper section and out the top surface of this section. Some of the longer wavelengths have a second ray vector in the upper section which causes part of their energy to be propagated back into the lower section (r vector total internal reflection). In either case, none of this light reaches the output surface of the detector. This is the case for the red light in FIG. 2.

The spectrometer of the invention is tuned to permit different colors to reach the detector by changing the incident angle, $\theta_{INC}$. Tuning is accomplished either by changing the direction of the incident light or by rotating the device. A change in $\theta_{INC}$ changes the length (n sin $\theta$) of all of the colors at the boundary surface. This controls the wavelength whose ray vector is parallel to the boundary in the upper section and, thus, selects which wavelengths are included in the spectrometer's passband.

The advantages of the invention are numerous.

a. The device can be miniaturized without compromising its performance. The two sections of the device need to be only a few wavelengths thick to effectively direct the energy within the passband to the detector.

b. A large percentage of the incident light within the passband will reach the detector. Light incident on the entire boundary surface is concentrated onto the detector by using the ray vector that is parallel to the surface.

The materials used in the spectrometer are selected and cut to minimize the difference between the k vector directions for the passband wavelengths in the two sections. This minimizes the reflection loss at the boundary surface and maximizes transmission into the upper section of the device.

c. With proper choice of materials for the upper and lower sections, the spectrometer may be used in the ultraviolet, visible, and infrared regions of the electromagnetic spectrum.

d. The birefringent spectrometer is easy to operate. The wavelengths in the passband are selected by changing the angle of incidence of the light on the input surface of the device.

As will be apparent to one of ordinary skill in the art in light of the description given here, a variety of alternatives of the invention are possible.

Some of the materials that may be used in the upper light output section for operation from the near ultraviolet, thought the visible, into the near infrared are calcite, $LiNbO_3$ (Lithium Niobate) and $LiIO_3$. Selenium or $TiO_2$ may be used for operation in the infrared.

Many materials may be used in the lower light input section. Among these are KBr, KCl, and KI which may all be used in the ultraviolet. From the near ultraviolet through the near infrared, sapphire, MgO, CsBr, and $BaF_2$ may all be used. Within the visible, sphene or even a flint glass, such as SF10 or SF8, can be used. Zinc Selenide (ZnSe) may be used through the visible into the near infrared. In the infrared, NaCl, NaF, and GaAs may all be used.

The material of the upper section shown in FIG. 2 was assumed to have a uniaxial optical indicatrix and strong birefringence but only minor dispersion of the indicatrices—as is true, for example, in a crystal of calcite.

Figure 3:
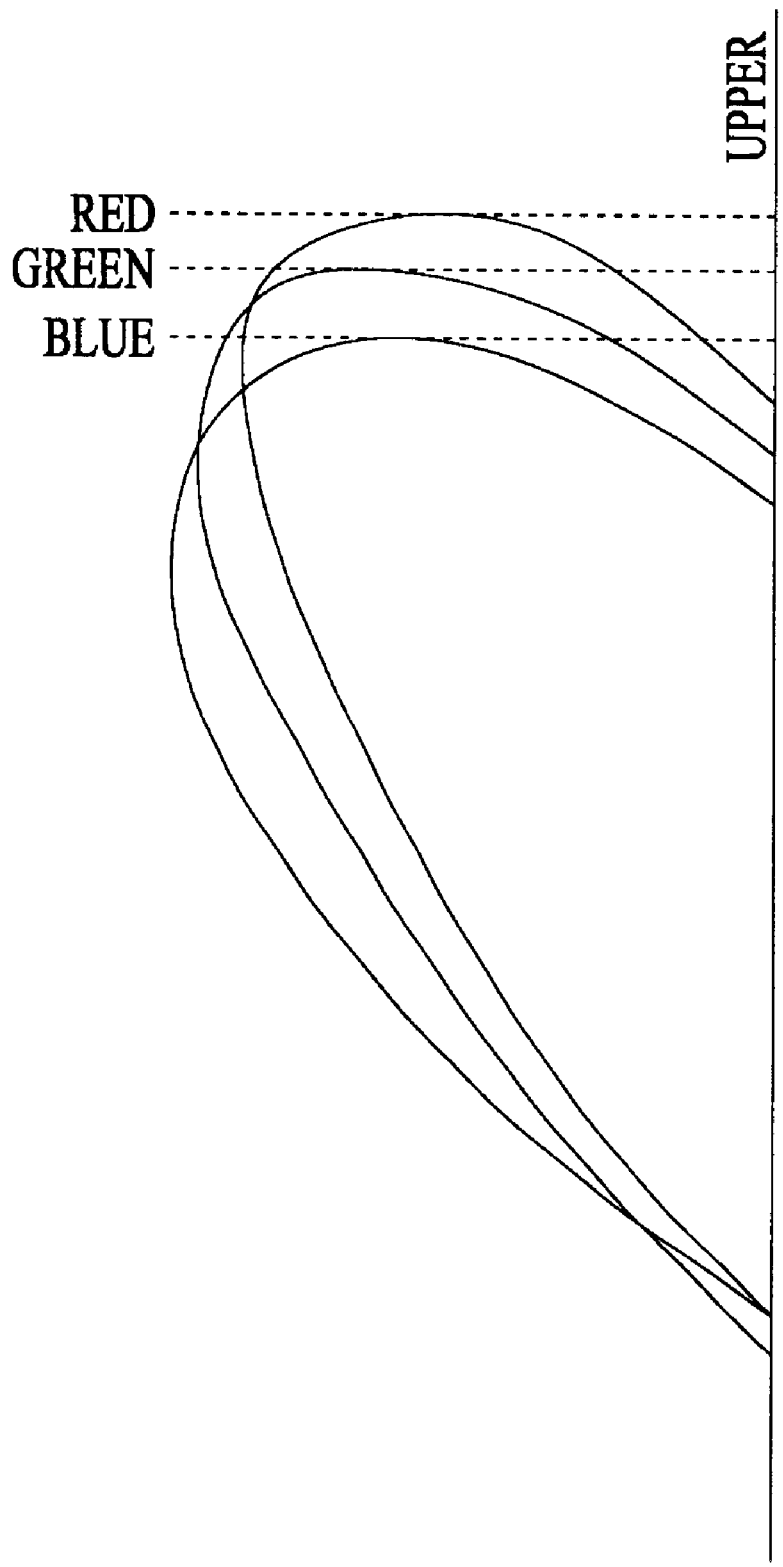
FIG. 3 illustrates an alternative embodiment of the invention.

Many biaxial birefringent materials exhibit "dispersion of the bisectrices" meaning that the different color index surfaces are not aligned. Monoclinic crystals that have "inclined dispersion" are one example of this. If the dispersion of the bisectrices is sufficiently larger than the dispersion of the indicatrices in a crystal, this type material could be used as the upper section and would have a chromatic order as shown in FIG. 3, which is the reverse of that shown in FIG. 2. This would give the spectrometer an ultra-narrow passband.

One skilled in the art will realize with the benefit of this description that the invention could also be implemented in the microwave and radio wave regions with appropriate modifications, however such modifications will of course require an enlargement of the device.

Obviously, many modifications and variations of the invention are possible in light of the above description. It is therefore to be understood that within the scope of the claims, the invention may be practiced otherwise than as has been specifically described.

What is claimed is:

1. A spectrometer for discerning components of collimated light comprising:

a P-polarizer for P-polarizing said collimated light;

an input optically transparent element having an input surface for receiving said P-polarized light and for transmitting said P-polarized light to a boundary surface of said input element, said input element being of a material that is of relatively high light dispersiveness that separates said P-polarized light into wavelength dependent (k-vector) directions representative of different colors, said input element being aligned with respect to said boundary surface to a maximize the dispersive effect of said material so that Snell component values at said boundary surface are made markedly different for different wavelengths of said P-polarized light; and an output optically transparent element for receiving said P-polarized light as transmitted through said input element and presented at said boundary surface and having an output surface for emitting light within a desired passband when present, said output element being of a highly birefringent, relatively low light dispersiveness material having an optic axis other than normal to said boundary surface and aligned to maximize the birefringence effect of said material, said material being characterized by having a plurality of index surfaces corresponding to different colors so that a Snell's component received from said input element within said passband aligns tangentially with one of said index surfaces to propagate light within said desired passband through said outer surface in the direction of a ray vector that is substantially parallel to said boundary surface.

2. The spectrometer of claim 1 wherein said P-polarized light is incident on said input surface at an angle of incidence and wherein frequencies within said passband of said spectrometer are selected by adjusting said angle of incidence.

3. The spectrometer of claim 1 wherein said output element has an extension that extends past said input element to terminate with said output surface.

4. The spectrometer of claim 3 wherein the length of said extension is selected to adjust the width of said passband.

5. The spectrometer of claim 1 wherein said output surface is beveled to maximize transmission of light in said passband through said output surface.

6. The spectrometer of claim 1 further including a detector for detecting the presence and intensity of light emitted at said output surface.

7. The spectrometer of claim 1 wherein said output optically transparent element is used for ultraviolet through visible light and wherein said output element is of a material chosen from the group of calcite, $LiNbO_3$, and $LiIO_3$.

8. The spectrometer of claim 1 wherein said output optically transparent element is used for infrared light and wherein said element is of a material chosen from the group of Selenium and $TiO_2$.

9. The spectrometer of claim 1 wherein said input optically transparent element is used for ultraviolet light and wherein said input element is of a material chosen from the group of KBr, KCl, and KI.

10. The spectrometer of claim 1 wherein said input optically transparent element is used for near-ultraviolet through infrared light and wherein said input element is of a material chosen from the group of sapphire, MgO, CsBr and $BaF_2$.

11. The spectrometer of claim 1 wherein said input optically transparent element is used for visible light and wherein said input element is of a material chosen from the group of sphene and flint glass.

12. The spectrometer of claim 1 wherein said input optically transparent element is used visible through infrared light and wherein said input element is of a ZnSe.

13. The spectrometer of claim 1 wherein said input optically transparent element is used for infrared light and wherein said input element is of a material chosen from the group of NaCl, NaF and GaAs.

14. The spectrometer of claim 1 wherein said output optically transparent element is chosen of a material exhibiting dispersion of the bisectrices.

* * * * *